US009705900B2

United States Patent
Thyni et al.

(10) Patent No.: US 9,705,900 B2
(45) Date of Patent: *Jul. 11, 2017

(54) MITIGATING THE IMPACT FROM INTERNET ATTACKS IN A RAN USING INTERNET TRANSPORT

(71) Applicant: Telefonaktiebolaget LM Ericsson (publ), Stockholm (SE)

(72) Inventors: Tomas Thyni, Järfälla (SE); Mats Forsman, Rönninge (SE); Mats Ullerstig, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 126 days.

This patent is subject to a terminal disclaimer.

(21) Appl. No.: 14/427,373

(22) PCT Filed: Feb. 9, 2015

(86) PCT No.: PCT/SE2015/050143
§ 371 (c)(1),
(2) Date: Mar. 11, 2015

(87) PCT Pub. No.: WO2016/130051
PCT Pub. Date: Aug. 18, 2016

(65) Prior Publication Data
US 2016/0373467 A1    Dec. 22, 2016

(51) Int. Cl.
*H04L 29/06*    (2006.01)
*H04L 29/08*    (2006.01)
(Continued)

(52) U.S. Cl.
CPC ...... *H04L 63/1416* (2013.01); *H04L 63/1425* (2013.01); *H04L 63/1441* (2013.01);
(Continued)

(58) Field of Classification Search
CPC ............. H04L 63/1416; H04L 63/1425; H04L 63/1441; H04L 2463/144; H04L 67/10;
(Continued)

(56) References Cited

U.S. PATENT DOCUMENTS 9,397,769 B2 * 7/2016 Mirbagheri ............... G01S 1/20
2006/0276173 A1 * 12/2006 Srey ...................... H04W 12/08
455/410

(Continued)

FOREIGN PATENT DOCUMENTS

WO    2008067335 A2    6/2008
WO    2010050983 A1    5/2010

OTHER PUBLICATIONS

Unknown, Author, "Intrusion detection system", Wikipedia, the free encyclopedia, Available online at: http://wikipedia.org/wiki/Intrusion_detection_system, Oct. 27, 2014, 1-7.
(Continued)

*Primary Examiner* — Aubrey Wyszynski
(74) *Attorney, Agent, or Firm* — Murphy, Bilak & Homiller, PLLC (57) ABSTRACT

The present disclosure relates to methods and devices for mitigating the impact from Internet attacks in a Radio Access Network, RAN, using Internet transport. This object is obtained by a method performed in network node in a RAN, using Internet transport. The method comprises obtaining intrusion detection information informing the network node that the RAN is under attack. The method further comprises selecting, based on the intrusion detection information, a mitigation action, the mitigation action mitigating the impact of the attack on the RAN service. Further the method comprises performing the selected mitigation action to mitigate the impact on the RAN service level.

23 Claims, 3 Drawing Sheets

(51) Int. Cl.
*H04W 12/12* (2009.01)
*H04W 84/04* (2009.01)
*H04W 36/00* (2009.01)
*H04W 52/04* (2009.01)
*H04W 36/24* (2009.01)

(52) U.S. Cl.
CPC ............. *H04L 67/10* (2013.01); *H04W 12/12* (2013.01); *H04L 2463/144* (2013.01); *H04W 36/00* (2013.01); *H04W 36/24* (2013.01); *H04W 52/04* (2013.01); *H04W 84/04* (2013.01)

(58) Field of Classification Search
CPC ..... H04W 12/12; H04W 84/04; H04W 36/00; H04W 52/04; H04W 63/24
USPC .......................................................... 726/23
See application file for complete search history.

(56) References Cited

U.S. PATENT DOCUMENTS

| | | |
|---|---|---|
| 2007/0123214 A1 | 5/2007 | Mock et al. |
| 2008/0086776 A1 | 4/2008 | Tuvell et al. |
| 2008/0114885 A1 | 5/2008 | Kulkarni et al. |
| 2008/0295171 A1* | 11/2008 | Singh .................. H04L 63/1416 726/23 |
| 2009/0088147 A1 | 4/2009 | Bu et al. |
| 2012/0151033 A1* | 6/2012 | Baliga ................. H04L 63/1425 709/224 |
| 2013/0344823 A1 | 12/2013 | Almgren et al. |
| 2015/0180898 A1 | 6/2015 | Liljenstam et al. |

OTHER PUBLICATIONS

Unknown, Author, "Intrusion prevention system", Wikipedia, the free encyclopedia, Available online at: http://en.wikipedia.org/wiki/Intrusion_prevention_system, Oct. 27, 2014, 1-3.

3GPP, Updated version of "Rationale and track of security decisions in Long Term Evolved RAN/3GPP System Architecture Evolution", Nokia et al., 3GPP TSG SA WG3 Security—SA3#45, Draft S3-060840, Dulles, USA, Oct. 31-Nov. 3, 2006, 1-66.

* cited by examiner

MITIGATING THE IMPACT FROM INTERNET ATTACKS IN A RAN USING INTERNET TRANSPORT

TECHNICAL FIELD

The present disclosure relates to methods, devices and computer programs of mitigating the impact of Internet attacks in a RAN using Internet transport.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE or wireless device, is wirelessly connected to a Radio Base Station, RBS, commonly referred to as a NodeB, NB, in UMTS, and as an evolved NodeB, eNodeB or eNB, in LTE. An RBS is a general term for a radio network node capable of transmitting radio signals to a UE and receiving signals transmitted by a UE.

Traditional transport services e.g. leased lines or Virtual Private Networks, VPNs, are used for transport in the Radio Access Network, RAN. These transport services are very expensive in particular for high bandwidth data services. Internet transport services are much cheaper than traditional transport services. Using Internet for transport services in the RAN will lower the transport cost dramatically. An Internet transport service cost can be a fraction of the cost of a traditional leased lines and VPN services. There is a clear trend in Enterprise networking to use Internet transport services for transport and Mobile Network Operators are starting to put forward this requirement also for the RAN.

Using Internet as transport will expose the connected equipment in the RAN to various attack threats e.g. hackers, viruses, bot-nets, trojans etc. Hackers will search connected devices in the RAN for vulnerability. An attack can start with a port-scan of an IP address on the equipment in the RAN to figure out open ports and then try to connect to the equipment in order to intrude the RAN-equipment.

A counter measurement used in transport networks today are Intrusion Detection System, IDS, and Intrusion Prevention System, IPS.

An IDS is a device or software application that monitors network or system activities for malicious activities or policy violations and produces reports to a management station. There are different types of IDS, but they all are designed to detect suspicious traffic in different ways. An IDS is primarily focused on identifying possible incidents, logging information about them, and reporting attempts.

An IPS can respond to a detected threat by attempting to prevent it from succeeding. IPS use several techniques to counter the attack e.g. dropping packets from attacker, changing the security environment (e.g. reconfiguring a firewall) or making changes in attacker's packet headers. The IPS functionality tries to stop or limit the impact of a network attack by working in-line with the real network traffic, to be able to take actions to actively prevent or block intrusions or denial of services attacks that are detected. These actions are in the form of activating filters to drop/block IP packets, resetting the connection, reassemble fragmented IP packet etc.

One problem when a radio access network and core network is connected to an unsecure network like the Internet is that the IPS has no knowledge of the impact an Internet attack will have on the RAN and the services delivered to the end-users connected to the RAN.

The IPS can take an action to drop traffic from an Internet attacker, but at the same time the usable capacity for e.g. a RBS in the RAN will be limited. This will result in that the RBS in the RAN will still try to serve equal amount of UEs as if the RBS had expected full capacity on the Internet transport services. This will result in very limited end-user performance and Quality of Experience, QoE. It is only when the RBS has so low/limited capacity that the radio signalling can't get through that the RBS will understand that the RBS must be taken out of service. The RBS can't detect that end-user traffic between a S/PGW in the CN and the RBS is dropped due to an Internet attack, even if major part of the traffic is dropped. The impact will only be seen by the UE as a very limited connection/service.

There is therefore a need for an improved solution for handling Internet attacks in a RAN using Internet transport, which solution solves or at least mitigates at least one of the above mentioned problems.

SUMMARY

An object of the present disclosure is to provide a method, device and computer program to mitigating the impact from Internet attacks in a Radio Access Network, RAN, using Internet transport, which seeks to mitigate, alleviate, or eliminate one or more of the above-identified deficiencies in the art and disadvantages singly or in any combination.

According to aspects, the disclosure presents a method, performed in a network node in a Radio Access Network, RAN, using Internet transport, of mitigating the impact from Internet attacks. The method comprises obtaining intrusion detection information informing the network node that the RAN is under attack. Selecting, based on the intrusion detection information, a mitigation action, the mitigation action mitigating the impact of the attack on the RAN service, and performing the selected mitigation action to mitigate the impact on the RAN service level.

According to aspects, the obtaining comprises receiving the intrusion detection information from an IDS. According to aspects, the IDS is located within the network node.

According to aspects, the mitigation action comprises initiating handover of UEs to neighboring RAN nodes.

According to aspects the mitigation action comprises increasing the received signal strength threshold value required by a UE to be allowed to connect the RAN node.

According to aspects, the mitigation action comprises to decreasing the cell size of the RBS of UEs captured by the cell.

According to aspects, the mitigation action comprises reporting that the RAN is under attack to neighbouring RAN nodes.

According to aspects the reporting further comprises proposed actions to be performed in the neighboring RAN nodes.

According to aspects, the network node is a Radio Base Station, RBS. According to aspects, the network node is a Base Station Controller, BSC. According to aspects, the network node is a Radio Network Controller, RNC.

According to further aspects, the disclosure relates to a computer program comprising computer program code which, when executed in a network node, causes the network node to execute the method according to above.

According to further aspects, the disclosure relates to a network node in a Radio Access Network, RAN, using Internet transport of mitigating the impact from Internet attacks, comprising a processor and a memory. The memory containing instructions executable by the processor whereby the network node is operative to obtain intrusion detection information informing the network node that the RAN is under attack. Select based on the intrusion detection information, a mitigation action, the mitigation action mitigating the impact of the attack on the RAN service. And perform the selected mitigation action to mitigate the impact on the RAN service level.

According to a further aspect the network node is further adapted to receiving the intrusion detection information from an IDS. According to a further aspect the network node is further adapted to have the IDS is located within the network node.

According to a further aspect the network node is further adapted so that the mitigation action comprises initiating handover of UEs to neighboring RAN nodes.

According to a further aspect the network node is further adapted so that the mitigation action comprises increasing the received signal strength threshold value required by a UE to be allowed to connect the RAN node.

According to a further aspect the network node is further adapted so that the mitigation action comprises to decreasing the cell size of the RBS of UEs captured by the cell.

According to a further aspect the network node is further adapted so that the mitigation action comprises reporting that the RAN is under attack to neighboring RAN nodes.

According to a further aspect the network node is further adapted so that the reporting further comprises proposed actions to be performed in the neighbouring RAN nodes According to a further aspect the network node is a Radio Base Station, RBS. According to a further aspect the network node is a Base Station Controller, BSC. According to a further aspect the network node is a Radio Network Controller, RNC.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The device, method and computer program disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Figure 1:
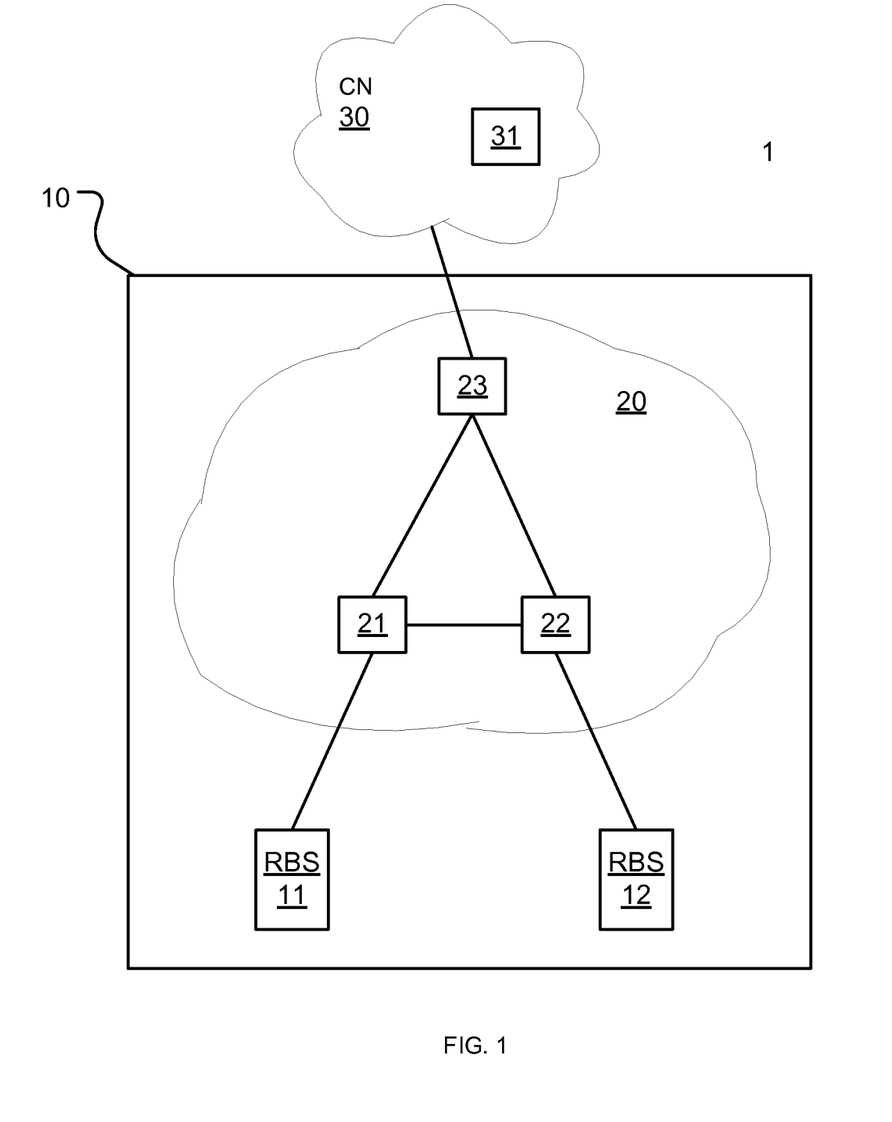
FIG. 1 schematically illustrates a cellular communication network in which exemplary embodiments of the present disclosure can be implemented.

FIG. 1 schematically illustrates an example of a cellular communication network 1 in which aspects of the present disclosure can be implemented. The cellular communication network 1 comprises a radio access network 10. The radio access network 10 comprises a radio access transport network 20. The radio access transport network 20 handles data traffic between e.g. radio base stations 11, 12 and between radio base stations 11, 12 and a core network 30. In this example of the cellular communication network 1 Internet transport services are used in the radio access transport network 20. In this example the radio access transport network 20 comprises several network nodes 21, 22, 23.

It is an object of the present disclosure to provide embodiments solving the problem of Internet attacks in a RAN using Internet transport. According to an aspect, intrusion detection is obtained informing a node in that the RAN that the RAN is under attack. And based on this information a mitigation action is selected. The mitigation action mitigating the impact of the attack on the RAN service level.

An example of a radio access network 10 is UTRAN, Universal Terrestrial Radio Access Network. The UTRAN is the radio access network 10 in UMTS, Universal Mobile Telecommunications System. Another radio access network 10 is E-UTRAN. The E-UTRAN is the radio access network 10 in an LTE system. The proposed methods could be performed in any node in the RAN 10 or outside the RAN 10 e.g. a cloud implementation.

Figure 2:
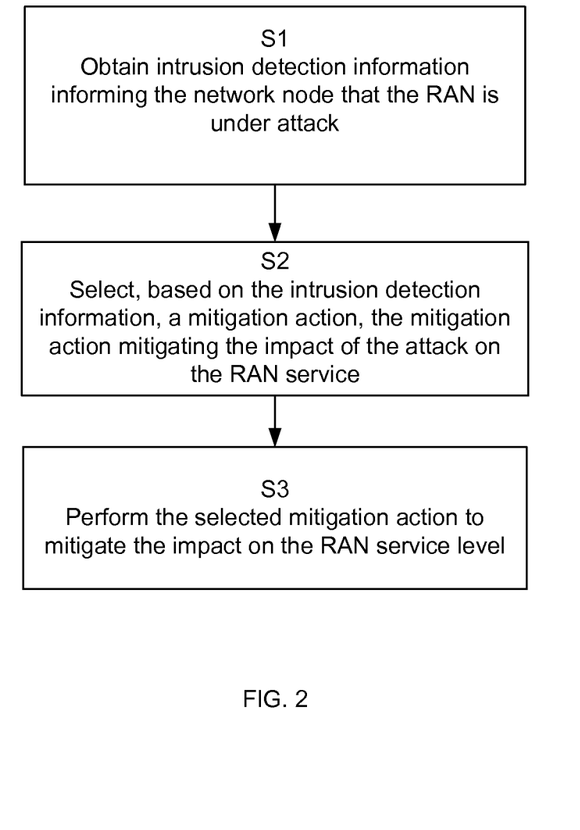
FIG. 2 is a flow chart illustrating the proposed methods performed in a network node.

The network node 11, 12, 21, 22, 23 in the RAN can be affected by an Internet attack in different ways. The internet attack can e.g. result in limited Internet transport capacity for the network node 11, 12, 21, 22, 23, processing capacity in the network node 11, 12, 21, 22, 23. The internet attack can also affect the memory and the buffers in the network node 11, 12, 21, 22, 23, so that the network node 11, 12, 21, 22, 23 cannot perform other tasks with the same capacity as when not under an Internet attack. FIG. 2 illustrates the steps in a method, performed in a network node 11, 12, 21, 22 and 23 in a Radio Access Network, RAN, 10 using Internet transport, of mitigating the impact from Internet attacks. In a first step 51 the network node 11, 12, 21, 22 and 23 obtains intrusion detection information informing the network node 11, 12, 21, 22 and 23 that the RAN 10 is under attack. In a next step S2 the network node 11, 12, 21, 22 and 23 selects, based on the intrusion detection information, a mitigation action, the mitigation action mitigating the impact of the attack on the RAN service level. The method further comprises, in a next step S3 that the network node 11, 12, 21, 22 and 23 performs the selected mitigation action to mitigate the impact on the RAN service level.

In other words in the first step 51 the network node 11, 12, 21, 22 and 23 can receive the intrusion detection information from another network node 11, 12, 21, 22 and 23 or obtain the intrusion detection information from the within the network node 11, 12, 21, 22 and 23.

Stated differently in the step S2 the network node 11, 12, 21, 22 and 23 chooses, based on the intrusion detection information, the mitigation action that can mitigate the impact of the attack on the RAN service level. Thus will the impact on the RAN service level due to the Internet attack be reduced or eliminated when the mitigation action is performed in step S3.

As mentioned above, according to one aspect of the present disclosure the network node 11, 12, 21, 22 and 23 receives the intrusion detection information from an IDS (not shown). The IDS can according to aspects of the present disclosure be located in different network node 11, 12, 21, 22 and 23 in the RAN 10. In one exemplary embodiment the IDS is located in the network node 11, 12.

Also as described above, according to another aspect of the present disclosure the IDS is located within the network node 11, 12, 21, 22 and 23. In this aspect the network node 11, 12, 21, 22 and 23 obtains the intrusion detection information directly from the network node 11, 12, 21, 22 and 23.

According to aspects of the present disclosure there are several mitigations actions that the network node 11, 12, 21, 22 and 23 can select from, in step S2, based on the intrusion detection information obtained in step 51. Some of the mitigations actions will be described below.

One mitigation action comprises initiating handover of UEs to neighboring RAN nodes 11 and 12. In this aspect if a UE is connected or associated with an RBS 11, 12 that suffer from limited Internet transport capacity due to an Internet attack, this UE will suffer limited RAN service level. It is therefore advantageous to handover this UE to a neighboring RBS 11, 12 that has full Internet transport capacity. This will increase the RAN service level for the UE.

Another mitigation action comprises that the network node 11, 12 that is affected by the Internet Attack reduces the number of UEs that is allowed to be connected to the network node 11, 12. According to one aspect the number of UEs that is allowed to be connected to the network node 11, 12 can be reduced per Radio Access Technology, RAT. In one embodiment of the present disclosure is the number of UEs that is allowed to be connected via RAT Long Term Evolution, LTE or High Speed Downlink Packet Access, HSDPA. In this aspect the required amount of Internet transport service is thus reduced by lowering the number of UEs that is allowed to be connected to the network node 11, 12.

In another aspect of the present disclosure the initiating of handover of UEs to neighbouring RAN nodes 11 and 12 further comprises sending a report of the Internet attack to RAN network node neighbours 11, 12, 21, 22 and 23. The report can comprise information that no handover should be performed to the RAN node 11 and 12 suffering from the Internet attack. Further the report can in other aspects of the disclosure comprise a timer indicating during how long that no handovers should be performed to the network node 11 and 12 suffering from reduced and/or no capacity due to the Internet attack.

According to another aspect the mitigation action comprises increasing the received signal strength threshold value required by UEs to be allowed to connect the RAN node 11 and 12. An advantage by increasing the received signal strength threshold value required by UEs to be allowed to connect the RAN node 11 and 12 is that fever UEs will request to connect to the RAN node 11 and 12. This since UEs require a higher signal strength to be allowed to connect to the RAN node 11 and 12. The RAN nodes 11 and 12 will thus require less Internet transport service capacity. Therefore the RAN nodes 11 and 12 can deliver a higher RAN service level to the UEs that are connected when the RAN nodes 11 and 12 suffer from an Internet attack.

In another aspect of the present disclosure increasing the received signal strength threshold value required by UEs to be allowed to connect the RAN node 11 and 12 comprises sending a report of the Internet attack to RAN network node neighbours 11, 12, 21, 22 and 23. The report can comprise information that no handover should be performed to the RAN node 11 and 12 suffering from the Internet attack. Further the report can in other aspects of the disclosure comprise a timer indicating during how long that no handovers should be performed to the network node 11 and 12 suffering from reduced and/or no capacity due to the Internet attack.

According to yet another aspect the mitigation action comprises decreasing the cell size of the RAN nodes 11 and 12 of UEs captured by the cell. An advantage by decreasing the cell size of the RAN nodes 11 and 12 is that fever UEs will request to connect to the RAN node 11 and 12. This since the cell size of the RAN nodes 11 and 12 are smaller. The RAN nodes 11 and 12 will thus require less Internet transport service capacity. Therefore the RAN nodes 11 and 12 can deliver a higher RAN service level to the UEs that are connected when the RAN nodes 11 and 12 suffer from an Internet attack.

In another aspect of the present disclosure decreasing the cell size of the RAN nodes 11 and 12 of UEs captured by the cell comprises sending a report of the Internet attack to RAN network node neighbours 11, 12, 21, 22 and 23.

According to a further aspect the mitigation action comprises reporting that the RAN is under attack to neighbouring RAN nodes. An advantage by reporting that the RAN is under attack to neighbouring RAN nodes 11, 12, 21, 22 and 23 is that neighbouring RAN nodes 11, 12, 21, 22 and 23 can prevent UEs from handing over to the network nodes 11, 12, 21, 22 and 23 that have reduced capacity due to the Internet attack.

In another exemplary embodiment of the present disclosure the reporting of that the RAN is under attack to neighbouring RAN nodes further comprises proposed actions to be performed in the neighbouring RAN nodes.

An advantage by proposing actions to be performed in the neighbouring RAN nodes is that RAN service level to UEs can be increase by performing actions that counteract the effect from the Internet attack. Many actions can according to aspects of the present disclosure be proposed to the neighbouring network nodes.

In one exemplary embodiment of the present disclosure the network node 11, 12 proposes to the neighbouring network node 11, 12 to increase the number of UEs that is allowed to be connected to the neighbouring network node 11, 12. According to one aspect the number of UEs that is allowed to be connected to the neighbouring network node 11, 12 can be increased per RAT. In one embodiment of the present disclosure is the number of UEs that is allowed to be connected via LTE or HSDPA is increased. In this aspect the neighbouring network node 11, 12 can accept more handovers from UEs. An advantage with this aspect is thus that the required amount of Internet transport service is reduced by increasing the number of UEs that is allowed to be connected to the neighbouring network node 11, 12.

According to yet another aspect of the present disclosure the network node 11, 12 proposes to the neighbouring network node 11, 12 to not hand over the UEs to the network node 11, 12. But instead handle the UEs at the neighbouring network node 11, 12 not suffering from the Internet attack.

According to this aspect the network node 11, 12 can propose to the neighbouring network node 11, 12 to hand over UEs connected to the neighbouring network node 11, 12 to another RAT at the neighbouring network node 11, 12. The neighbouring network node 11, 12 can handover UEs using LTE to e.g. WCDMA or GSM/EDGE. GSM/EDGE uses lower frequencies and thus often has better signal to noise ratio. In this aspect it is therefore advantageous for the neighbouring network node 11, 12 to hand over the UE to another RAT at the neighbouring network node 11, 12 than to hand over the UE to the network node 11, 12 suffering from the Internet attack.

According to one aspect of the present disclosure the network node 11 and 12 in the RAN is a Radio Base Station, RBS. In yet another aspect of the present disclosure the network node 21, 22 and 23 is a Base Station Controller, BSC.

According to another aspect of the present disclosure the network node 11 and 12 in the RAN is a NodeB. In yet another aspect of the present disclosure the network node 21, 22 and 23 is a Radio Network Controller, RNC.

In aspects of the present disclosure where the network node 11 and 12 is a RBS, the RBS 11 and 12 can report the attack to a BSC. The report can comprise information that no handover should be performed to a specific RBS 11 and 12 that suffer from the Internet attack. Further the report can in other aspects of the disclosure comprise a timer indicating during how long that no handovers should be performed to the RBS 11 and 12 suffering from reduced and/or no capacity due to the Internet attack.

In another aspect of the present disclosure where the network node 11 and 12 is a NodeB, the NodeB 11 and 12 can report the attack to the RNC. The report can comprise information that no handover should be performed to a specific NodeB 11 and 12 that suffer from the Internet attack. Further the report can in other aspects of the disclosure comprise a timer indicating during how long that no handovers should be performed to the NodeB 11 and 12 suffering from reduced and/or no capacity due to the Internet attack.

Figure 3:
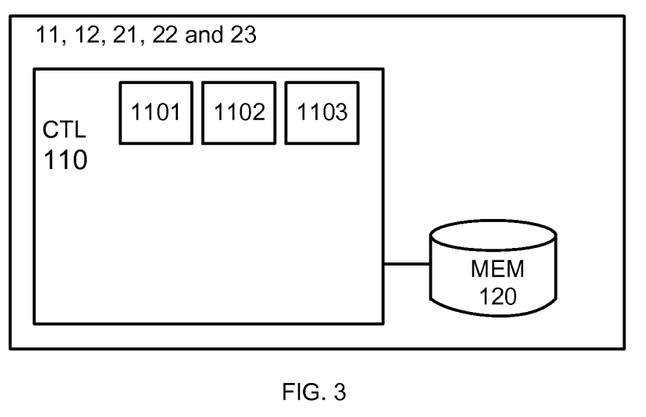
FIG. 3 is a schematic diagram illustrating a network node according to an exemplary embodiment of the present disclosure.

Turning now to FIG. 3, a schematic diagram is disclosed illustrating an exemplary embodiment of the network node 11, 12, 21, 22 and 23 in the RAN 10, using Internet transport of mitigating the impact from Internet attacks. The network node 11, 12, 21, 22 and 23 comprises a processor 110 and a memory 120, the memory 212 containing instructions executable by the processor 110. The processor 110 is a Central Processing Unit, CPU, microcontroller, Digital Signal Processor, DSP, or any other suitable type of processor capable of executing computer program code. The memory 212 is a Random Access Memory, RAM, a Read Only Memory, ROM, or a persistent storage, e.g. a single or combination of magnetic memory, optical memory, or solid state memory or even remotely mounted memory.

According to one aspect, the disclosure further relates to the above mentioned computer program, comprising computer readable code which, when run on the network node 11, 12, 21, 22 and 23 causes the network node 11, 12, 21, 22 and 23 to perform any of the aspects of the method described above.

When the above-mentioned computer program code is run in the processor 110 of the network node 11, 12, 21, 22 and 23 it causes the network node 11, 12, 21, 22 and 23 to obtain intrusion detection information informing the network node 11, 12, 21, 22 and 23 that the RAN is under attack. The computer program codes further causes the network node 11, 12, 21, 22 and 23 to select, based on the intrusion detection information, a mitigation action, the mitigation action mitigating the impact of the attack on the RAN service. Further, the computer program code causes the network node 11, 12, 21, 22 and 23 to perform the selected mitigation action to mitigate the impact on the RAN service level.

According to one aspect, the disclosure further relates to the above mentioned computer program, comprising computer readable code which, when run on the network node 11, 12, 21, 22 and 23, causes the network node 11, 12, 21, 22 and 23 to perform any of the aspects of the method described above.

According to one aspect of the disclosure the processor 110 comprises one or several of:
an obtaining module 1101 adapted to obtain intrusion detection information informing the network node that the RAN is under attack;
a selecting module 1102 adapted to select, based on the intrusion detection information, a mitigation action, the mitigation action mitigating the impact of the attack on the RAN service; and
a performing module 1103 adapted to perform the selected mitigation action to mitigate the impact on the RAN service level.

According to a further aspect the network node 11, 12, 21, 22 and 23 is further adapted to receiving the intrusion detection information from an IDS. According to one aspect the network node 11, 12, 21, 22 and 23 comprises an obtaining module 1101 configured for this purpose.

According to a further aspect the network node 11, 12, 21, 22 and 23 is further adapted to have the IDS is located within the network node. According to one aspect the network node 11, 12, 21, 22 and 23 comprises an obtaining module 1101 configured for this purpose.

According to a further aspect the network node 11, 12, 21, 22 and 23 is further adapted so that the mitigation action comprises initiating handover of UEs to neighboring RAN nodes 11, 12, 21, 22 and 23. According to one aspect the network node 11, 12, 21, 22 and 23 comprises a selecting module 1102 configured for this purpose.

According to a further aspect the network node 11, 12, 21, 22 and 23 is further adapted so that the mitigation action comprises increasing the received signal strength threshold value required by a UE to be allowed to connect the RAN node. According to one aspect the network node 11, 12, 21, 22 and 23 comprises a selecting module 1102 configured for this purpose.

According to a further aspect the network node 11, 12, 21, 22 and 23 is further adapted so that the mitigation action comprises to decreasing the cell size of the RBS of UEs captured by the cell. According to one aspect the network node 11, 12, 21, 22 and 23 comprises a selecting module 1102 configured for this purpose.

According to a further aspect the network node 11, 12, 21, 22 and 23 is further adapted so that the mitigation action comprises reporting that the RAN 10 is under attack to neighboring RAN nodes 11, 12, 21, 22 and 23. According to one aspect the network node 11, 12, 21, 22 and 23 comprises a selecting module 1102 configured for this purpose.

According to a further aspect the network node 11, 12, 21, 22 and 23 is further adapted so that the reporting further comprises proposed actions to be performed in the neighbouring RAN nodes 11, 12, 21, 22 and 23. According to one aspect the network node 11, 12, 21, 22 and 23 comprises a selecting module 1102 configured for this purpose.

According to a further aspect the network node 11 and 12 is a Radio Base Station, RBS. According to a further aspect the network node 11, 12, 21, 22 and 23 is a Base Station Controller, BSC. According to a further aspect the network node 11, 12, 21, 22 and 23 is a Radio Network Controller, RNC.

The obtaining module 1101, selecting module 1102 and performing module 1103 are implemented in hardware or in software or in a combination thereof. The modules 1101, 1102 and 1103 are according to one aspect implemented as a computer program stored in the memory 120 which run on the processing circuitry 110. The network node 11, 12, 21, 22 and 23 is further configured to implement all the aspects of the disclosure as described in relation to the methods above.

The present disclosure is not limited to only attacks from the Internet transport network in the RAN 10. According to aspects of the present disclosure Internet transport is not used in the RAN 10. In these and in embodiments where Internet transport is used attack can also occur from other sources in the RAN 10, CN 30 or UE 13. These attacks can also be mitigated with the methods, devices and computer programs described above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method, performed in a network node in a Radio Access Network (RAN) and using Internet transport to provide services to user equipments (UEs) served by the RAN, of mitigating impacts from Internet attacks, the method comprising:
    obtaining intrusion detection information informing the network node that the network node is under attack via an Internet connection to the network node;
    selecting, based on the intrusion detection information, a mitigation action, the mitigation action mitigating the impact of the attack on a RAN service provided by the RAN; and
    performing the selected mitigation action to mitigate the impact on a service level for the RAN service.

2. The method of claim 1, wherein the obtaining comprises receiving the intrusion detection information from an Intrusion Detection System (IDS).

3. The method of claim 2, wherein the IDS is located within the network node.

4. The method of claim 1, wherein the mitigation action comprises initiating handover of UEs to a neighboring network node.

5. The method of claim 1, wherein the mitigation action comprises increasing the received signal strength threshold value required by a UE to be allowed to connect the network nodes.

6. The method of claim 1, wherein the mitigation action comprises decreasing the cell size of the network nodes of UEs captured by a cell.

7. The method of claim 1, wherein the mitigation action comprises reporting, to neighboring network nodes, that the RAN is under attack.

8. The method of claim 7, wherein said reporting comprises proposed actions to be performed in the neighboring network nodes.

9. The method of claim 1, wherein the network node is a Radio Base Station (RBS).

10. The method of claim 1, wherein the network node is a Base Station Controller (BSC).

11. The method of claim 1, wherein the network node is a Radio Network Controller (RNC).

12. A network node configured for use in a Radio Access Network (RAN) and to use Internet transport to provide services to user equipments (UEs) served by the RAN, the network node comprising a processor and a memory, said memory containing instructions executable by said processor, whereby said network node is configured to:
    obtain intrusion detection information informing the network node that the network node is under attack via an Internet connection to the network node;
    select, based on the intrusion detection information, a mitigation action, the mitigation action mitigating the impact of the attack on a RAN service provided by the RAN; and
    perform the selected mitigation action to mitigate the impact on a service level for the RAN service.

13. The network node of claim 12, wherein the network node is configured to obtain the intrusion detection information by receiving the intrusion detection information from an Intrusion Detection System (IDS).

14. The network node of claim 12, wherein the IDS is located within the network node.

15. The network node of claim 12, wherein the mitigation action comprises initiating handover of UEs to a neighboring network node.

16. The network node of claim 12, wherein the mitigation action comprises increasing the received signal strength threshold value required by a UE to be allowed to connect the network node.

17. The network node of claim 12, wherein the mitigation action comprises to decreasing the cell size of the network node of UEs captured by the cell.

18. The network node of claim 12, wherein the mitigation action comprises reporting that the RAN is under attack to neighboring network nodes.

19. The network node network node of claim 18, wherein the reporting comprises proposed actions to be performed in the neighboring network node.

20. The network node of claim 12, wherein the network node is a Radio Base Station (RBS).

21. The network node of claim 12, wherein the network node is a Base Station Controller (BSC).

22. The network node of claim 12, wherein the network node is a Radio Network Controller (RNC).

23. A non-transitory computer-readable storage medium, having stored thereupon a computer program that, when run in a network node in a Radio Access Network (RAN) and using Internet transport to provide services to user equipments (UEs), causes the network node to:
- obtain intrusion detection information informing the network node that the network node is under attack via an Internet connection to the network node;
- select, based on the intrusion detection information, a mitigation action, the mitigation action mitigating the impact of the attack on a RAN service provided by the RAN; and
- perform the selected mitigation action to mitigate the impact on a service level for the RAN service.

* * * * *